No. 732,514. Patented June 30, 1903.

UNITED STATES PATENT OFFICE.

DAVID BRAZELL, OF BRUNSWICK, GEORGIA.

VARNISH AND METHOD OF COMPOUNDING.

SPECIFICATION forming part of Letters Patent No. 732,514, dated June 30, 1903.

Application filed March 26, 1903. Serial No. 149,733. (No specimens.)

*To all whom it may concern:*

Be it known that I, DAVID BRAZELL, a citizen of the United States, residing at Brunswick, in the county of Glynn and State of Georgia, have invented new and useful Improvements in Varnishes and Methods of Compounding, of which the following is a specification.

My invention relates to improvements in a compound for varnish and the method of preparing the same.

The object of my invention is to produce a varnish which after having dried has a smoother surface and a greater gloss and also produce a varnish which is more durable, that is less subject to scratches, and which is less materially affected by either heat or moisture than in varnishes heretofore produced.

My invention consists in the method of compounding the following ingredients in the following proportions, herein stated, to produce one gallon of varnish: First, take three pints and a gill of raw linseed-oil and boil the same for three minutes, and I preferably use a copper kettle or receptacle, as I find that this produces better results. The object of using the raw linseed-oil is to have the oil boiled exactly the stated length of time, and the different manufacturers boil the oil different lengths of time, and it would be impossible to use the boiled oil and at all times produce good results. After the linseed-oil has boiled three minutes add one quart of melted rosin and allow the two ingredients to boil for two minutes and then add three pints of white Japan drier and allow the three to boil for three minutes. The contents of the kettle or receptacle is caused to stop boiling either by removing the same from the pot or removing the pot from the fire and is allowed to stand for two minutes after it has stopped boiling. After this add a gill of beeswax dissolved in half a gill of alcohol, and after this add a gill of turpentine. The mixture is then allowed to thoroughly cool, and then add one gill of gasolene or benzene, and, allowing for considerable evaporation and distillation, I produce one gallon of my improved varnish.

Each and all of the before-mentioned ingredients are necessary to produce a varnish having the qualities of my improved varnish. The linseed-oil gives the varnish the elastic finish, and the body and gloss are obtained by the rosin. The Japan drier is for the purpose well known, while the turpentine gives it the cutting qualities to keep from settling, and the alcohol and beeswax give it the slick appearance and prevent the water-marks and scratches from showing thereon.

Having thus described my invention, what I claim, and desire to secure by Letters Patent, is—

1. The herein-described composition of matter, consisting of raw linseed-oil, rosin, white Japan drier, beeswax, alcohol, turpentine and a volatile petroleum product.

2. The herein-described composition of matter, consisting of the following ingredients in about the proportions named, three pints and a gill of raw linseed-oil, one quart of melted rosin, three pints of white Japan drier, one gill of beeswax, half a gill of alcohol, one gill of turpentine, and one gill of volatile petroleum product.

3. The herein-described method of compounding the following ingredients, take three pints and a gill of raw linseed-oil and boil it for three minutes; add one quart of melted rosin and allow the two to boil for two minutes; add three pints of white Japan drier and boil for three minutes; the same is then stopped boiling and allowed to stand for two minutes and then add a gill of beeswax dissolved in a half gill of alcohol, then add a gill of turpentine and after this has cooled, add a gill of a volatile petroleum product.

In testimony whereof I have hereunto set my hand in the presence of two subscribing witnesses.

DAVID BRAZELL.

Witnesses:
J. A. MONTGOMERY,
A. M. WOODDALL.